(12) United States Patent
Hori et al.

(10) Patent No.: US 10,539,224 B2
(45) Date of Patent: Jan. 21, 2020

(54) LUBRICATING DEVICE OF GEAR APPARATUS FOR VEHICLE

(71) Applicant: TOYOTA JIDOSHA KABUSHIKI KAISHA, Toyota-shi, Aichi-ken (JP)

(72) Inventors: Tetsuo Hori, Toyota (JP); Hakuba Okuno, Nagakute (JP); Yukinobu Nishikawa, Anjo (JP); Hiroaki Kiyokami, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 222 days.

(21) Appl. No.: 15/670,612

(22) Filed: Aug. 7, 2017

(65) Prior Publication Data

US 2018/0045294 A1   Feb. 15, 2018

(30) Foreign Application Priority Data

Aug. 12, 2016 (JP) .................... 2016-159039

(51) Int. Cl.
*F16H 57/04* (2010.01)
*B60K 6/445* (2007.10)

(52) U.S. Cl.
CPC ......... *F16H 57/0456* (2013.01); *B60K 6/445* (2013.01); *F16H 57/043* (2013.01); *F16H 57/046* (2013.01)

(58) Field of Classification Search
CPC .................. F16H 57/0423; F16H 57/0456
See application file for complete search history.

(56) References Cited

U.S. PATENT DOCUMENTS

| | | | | |
|---|---|---|---|---|
| 3,738,452 A | * | 6/1973 | Hausinger | ........... F16H 57/0421 184/6.12 |
| 4,169,519 A | * | 10/1979 | Hirt | ..................... F16H 57/0456 184/6.12 |
| 5,158,152 A | * | 10/1992 | Nemoto | .............. F16H 57/0447 184/6.12 |
| 8,670,694 B2 | * | 3/2014 | Nakura | ................ G03G 15/757 399/167 |
| 2007/0295159 A1 | * | 12/2007 | Nishi | ...................... F16H 57/04 74/606 R |
| 2014/0054114 A1 | * | 2/2014 | Isomura | .............. F16H 57/0423 184/6.12 |

FOREIGN PATENT DOCUMENTS

| | | |
|---|---|---|
| DE | 102012214082 B3 | 12/2013 |
| JP | H09-060712 A | 3/1997 |
| JP | H10-122310 A | 5/1998 |

* cited by examiner

*Primary Examiner* — Minh Truong
(74) *Attorney, Agent, or Firm* — Oliff PLC (57) ABSTRACT

A lubricating device of a gear apparatus for a vehicle lubricates a low-rotation-side gear and a high-rotation-side gear meshing with the low-rotation-side gear. The lubricating device comprises a first tooth surface lubricating oil supply part configured to supply a lubricating oil directly to a tooth surface position located more upstream of a rotating direction of the low-rotation-side gear than a meshing position of the low-rotation-side gear with the high-rotation-side gear so as to spray some of the lubricating oil from the tooth surface position toward a tooth surface of the high-rotation-side gear, and an in-shaft lubricating oil supply part configured to supply the lubricating oil into a shaft of the high-rotation-side gear.

2 Claims, 7 Drawing Sheets

RELATED ART

FIG. 9

RELATED ART

| PART | OIL FILM FORMING METHOD | TOOTH SURFACE COOLING METHOD |
|---|---|---|
| HIGH-SPEED ROTATION-SIDE GEAR | FORCED LUBRICATION | ← |
| LOW-SPEED ROTATION-SIDE GEAR | FORCED LUBRICATION | ← | ns
LUBRICATING DEVICE OF GEAR APPARATUS FOR VEHICLE

INCORPORATION BY REFERENCE

The disclosure of Japanese Patent Application No. 2016-159039 filed on Aug. 12, 2016 including the specification, drawings and abstract is incorporated herein by reference in its entirety.

BACKGROUND

1. Technical Field

The technical field relates to a lubricating device of a gear apparatus for a vehicle to lubricate a low-rotation-side gear and a high-rotation-side gear meshing with the low-rotation-side gear.

2. Description of Related Art

There have been known lubricating devices of gear apparatuses for vehicles to lubricate low-rotation-side gears and high-rotation-side gears meshing with the low-rotation-side gears. In such gear apparatuses for the vehicles, in order to secure durability of gear pairs of the low-rotation-side gears and the high-rotation-side gears, it is required to securely perform both formation of oil films on tooth surfaces of the low-rotation-side gears and the high-rotation-side gears and cooling of the tooth surfaces thereof. A lubricating device of a gear apparatus for a vehicle described in Japanese Patent Application Publication No. 10-122310 includes: lubricating oil supply nozzles to directly supply a lubricating oil to a meshing position between a large gear as a low-rotation-side gear and a small gear as a high-rotation-side gear; and a lubricating oil supply pipe to supply an oil from an oil pump to the lubricating oil supply nozzles, and this lubricating device is configured to directly supply oil mist to the above meshing part.

Figure 8:
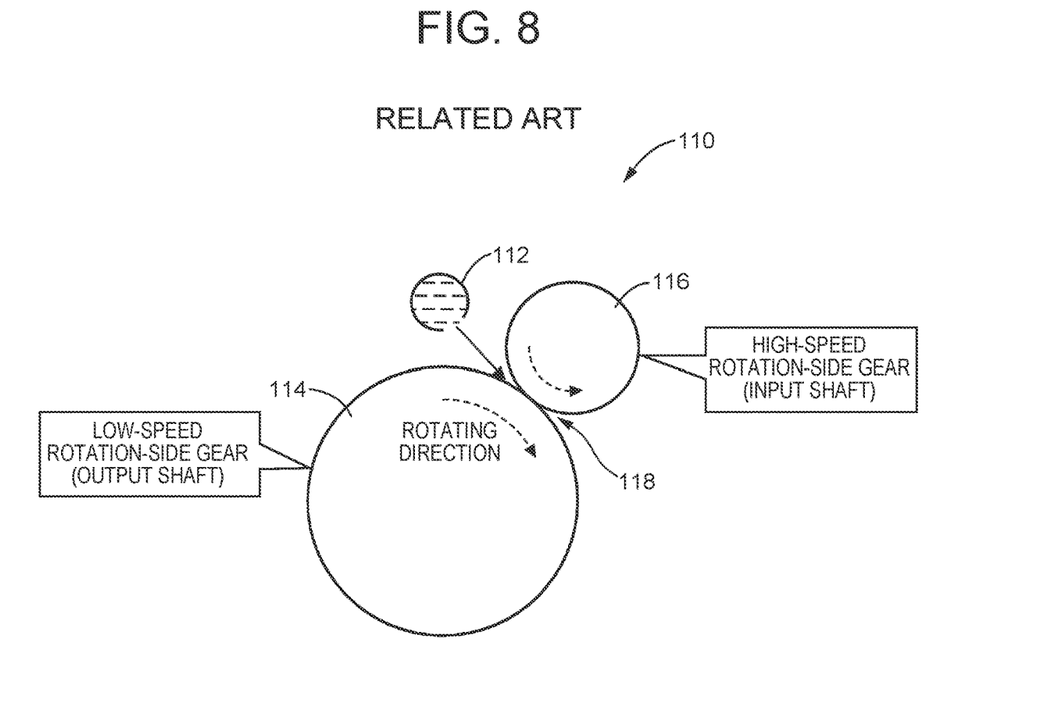
FIG. 8 is a schematic view explaining one example of lubrication on a low-rotation-side gear and a high-rotation-side gear by a lubricating device of a gear apparatus for a vehicle of related art.
Figure 9:
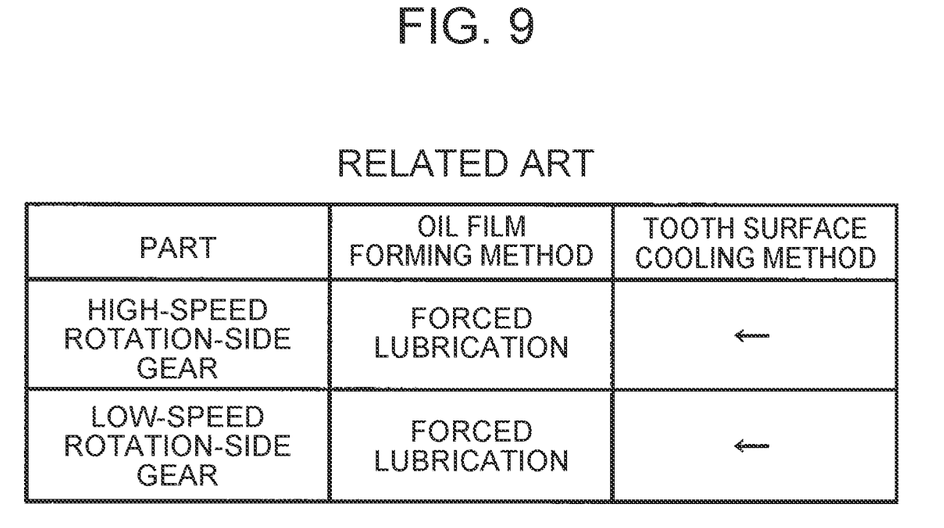
FIG. 9 is a view explaining one example of the lubricating method in the lubricating device of the gear apparatus for the vehicle of the related art in FIG. 8.

FIG. 8 is a schematic view explaining one example of a lubricating device of a gear apparatus for a vehicle of related art as described in JP 10-122310 A. FIG. 9 is a view explaining one example of a lubricating method in the lubricating device of the gear apparatus for the vehicle of the related art. Arrows in FIG. 9 indicate that a tooth surface cooling method of a low-rotation-side gear (low-speed rotation-side gear) is a forced lubrication that is the same as that of an oil film forming method, and a tooth surface cooling method of a high-rotation-side gear (high-speed rotation-side gear) is a forced lubrication that is the same as that of the oil film forming method. In FIG. 8, a lubricating device 110 of a gear apparatus for a vehicle of the related art includes an oil supply pipe 112 above a low-rotation-side gear (low-speed rotation-side gear) 114 provided to an output shaft, and supplies the lubricating oil directly to a meshing position 118 between a high-rotation-side gear (high-speed rotation-side gear) 116 provided to an input shaft and the low-rotation-side gear 114. Here, to supply the lubricating oil directly to gears so as to lubricate tooth surfaces of these gears is referred to as a forced lubrication. As shown in FIG. 9, through this forced lubrication, formation of the oil film on the tooth surfaces of the low-rotation-side gear 114 and the high-rotation-side gear 116, and cooling of the tooth surfaces thereof are both secured.

SUMMARY

Meanwhile, in the lubricating method of lubricating both the low-rotation-side gear and the high-rotation-side gear through the forced lubrication in the lubricating device of the gear apparatus for the vehicle of the above-described related art, it is possible to secure durability of the low-rotation-side gear and the high-rotation-side gear, but for example, there might be caused a problem that a so-called agitation loss becomes greater because the lubricating oil on the tooth surfaces is sandwiched and pressurized at the above meshing position due to a high circumferential speed, or the like; consequently, a mechanical loss becomes greater.

An object of the present disclosure is to provide a lubricating device capable of securing durability of a low-rotation-side gear and a high-rotation-side gear, while reducing an agitation loss of a lubricating oil at a meshing position between the gear pair.

A first aspect of the present disclosure is a lubricating device of a gear apparatus for a vehicle, the lubricating device lubricating a low-rotation-side gear and a high-rotation-side gear meshing with the low-rotation-side gear, and the lubricating device includes: a first tooth surface lubricating oil supply part configured to supply a lubricating oil directly to a tooth surface position located upstream of a meshing position of the low-rotation-side gear with the high-rotation-side gear in a rotating direction of the low-rotation-side gear than so as to spray some of the lubricating oil from the tooth surface position toward a tooth surface of the high-rotation-side gear; and an in-shaft lubricating oil supply part configured to supply the lubricating oil into a shaft of the high-rotation-side gear.

In a second aspect of the present disclosure, in the first aspect, when a first rotational angle range of the low-rotation-side gear located above a rotary axial line of the low-rotation-side gear is set to be from 0° to 180° in the rotating direction of the low-rotation-side gear, the meshing position of the low-rotation-side gear with the high-rotation-side gear may be located within a second rotational angle range that is included in the first rotational angle range, and that is equal to or larger than 90° and is less than 180°.

In a third aspect of the present disclosure, in the first aspect or the second aspect, the first tooth surface lubricating oil supply part may be arranged such that in a plane orthogonal to respective rotary axial lines of the low-rotation-side gear and the high-rotation-side gear, a tangential line passing through the tooth surface position of the low-rotation-side gear on an addendum circle of the low-rotation-side gear is set to pass through the high-rotation-side gear. In addition, the first tooth surface lubricating oil supply part may be arranged such that the tangential line passing through the tooth surface position of the low-rotation-side gear on the addendum circle of the low-rotation-side gear is set to pass through the rotary axial line of the high-rotation-side gear.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, one embodiment example of a lubricating device of a gear apparatus for a vehicle of the present disclosure will be described in detail with reference to drawings.

Figure 1:
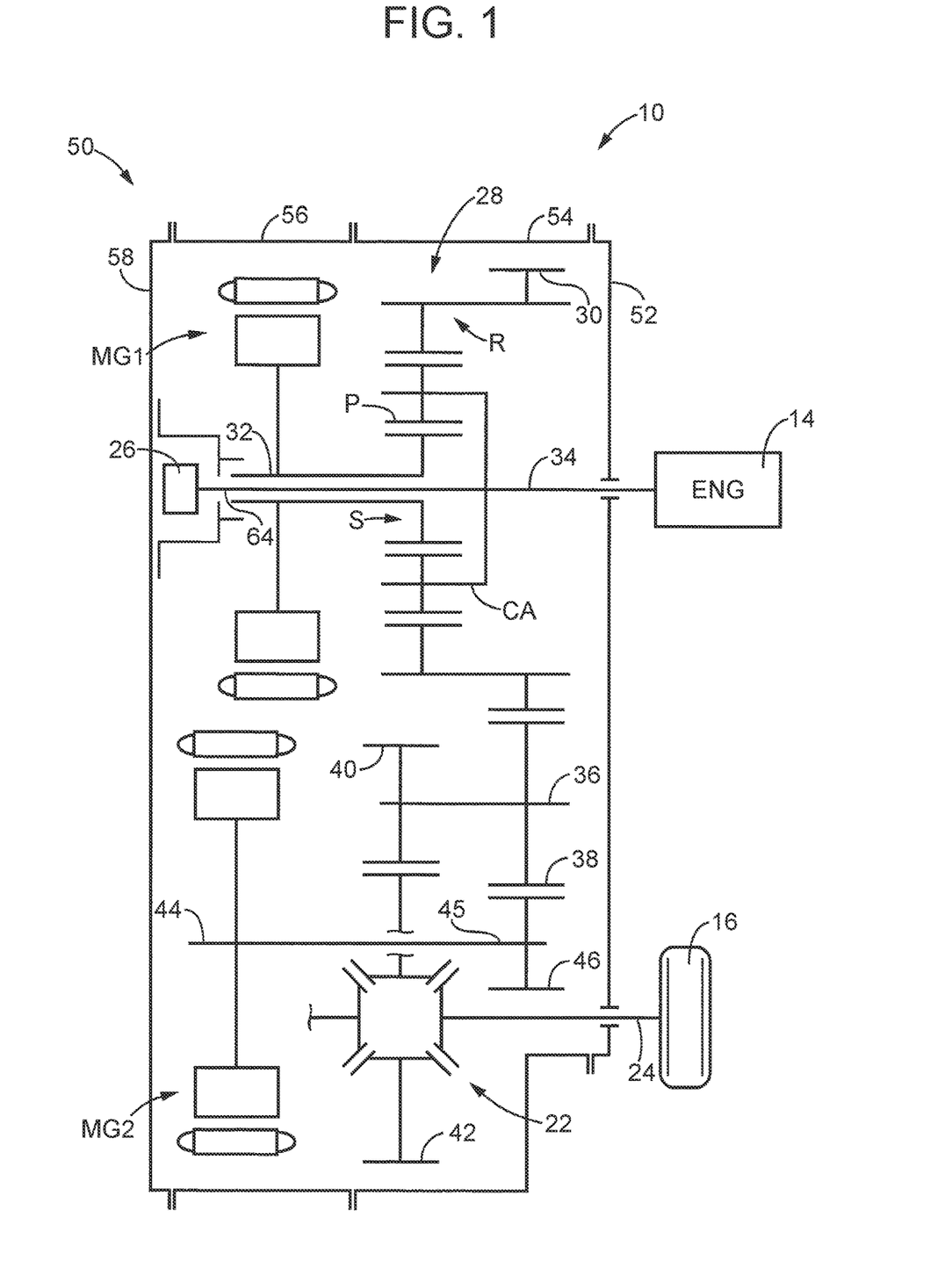
FIG. 1 is an outline view explaining a schematic configuration of a power transmission system for a hybrid vehicle to which the present disclosure is applied.

FIG. 1 is an outline view explaining a configuration of a power transmission system for a hybrid vehicle 10 (hereinafter, referred to as a "power transmission system 10") to which the present disclosure is applied. In the outline view of FIG. 1, a hybrid vehicle (hereinafter, referred to as a "vehicle") includes: an engine 14 as a drive power source for traveling; and the power transmission system 10 to transmit a motive power of the engine 14 to a pair of right and left driven wheels 16. The power transmission system 10 includes a planetary gear unit 28 that distributes the motive power inputted from the engine 14 via an input shaft 34 to a first electric motor MG1 and an output gear 30, and a reduction shaft 45, a counter shaft 36, a differential gear unit 22, a pair of right and left axles 24, and others that are coupled to a second rotor shaft 44 that is an output shaft of a second electric motor MG2. The vehicle includes an oil pump 26 that is rotary-driven by the engine 14 so as to generate a hydraulic oil pressure serving as a source pressure of a hydraulic pressure control circuit, and supply a lubricating oil to the first electric motor MG1, the second electric motor MG2, and the planetary gear unit 28, etc.

The planetary gear unit 28 is a single-pinion type planetary gear unit that includes, as three rotary elements (rotary members), a sun gear S that is a rotary element coupled to a first rotor shaft 32 of the first electric motor MG1; a ring gear R that is a rotary element coupled to the driven wheels 16 in a manner as to transmit the motive power, and meshes with the sun gear S via a pinion gear P; and a carrier CA that supports the pinion gear P in a manner as to allow rotation of the pinion gear P around its own axis as well as an orbital revolution thereof, and this planetary gear unit 28 functions as a differential mechanism. The input shaft 34 is coupled to the engine 14, and the carrier CA is coupled to the engine 14 via the input shaft 34. The ring gear R is a cylindrical member, includes an internal gear meshing with the pinion gear P, and is formed on an outer circumferential surface thereof with an output gear 30. The output gear 30 meshes with a counter driven gear 38 integrally provided to a counter shaft 36 parallel to the input shaft 34. A differential drive gear 40 integrally provided to the counter shaft 36 meshes with a differential input gear 42 of the differential gear unit 22.

A second rotor shaft 44 has a cylindrical shape, and is formed with internal spline teeth on an inner circumferential surface at an end on the reduction shaft 45 side of the second rotor shaft 44. The reduction shaft 45 has a cylindrical shape, is formed with outer circumferential spline teeth on an outer circumferential surface at an end on the second rotor shaft 44 side of the reduction shaft 45, and is coupled to the second rotor shaft 44 through a spline-fitting in a manner as to transmit the motive power. A second output gear 46 is integrally provided to the reduction shaft 45, and meshes with the counter driven gear 38. Through this, the second electric motor MG2 is coupled to the driven wheels 16 via the counter shaft 36, the differential gear unit 22, and the axles 24 in a manner as to transmit the motive power.

An oil pump drive shaft 64 is so disposed as to be concentric to the first rotor shaft 32, and extend through the first rotor shaft 32 on an inner circumference side of the first rotor shaft 32 to be coupled to the engine 14 via the input shaft 34. An oil pump 26 is coupled to the oil pump drive shaft 64 to be rotary-driven by the engine 14.

The first electric motor MG1 and the second electric motor MG2 are composed of AC synchronous motors, and each of them is a motor generator having a function as a motor (electric motor) that generates a drive power, and a function as a generator (electric power generator) that generates a reaction force. The first electric motor MG1 has at least the function as the generator, and the second electric motor MG2 has at least the function as the motor.

In the above-configured power transmission system 10, the motive power from the engine 14 is transmitted to the output gear 30 of the planetary gear unit 28, and is then outputted to the differential input gear 42 of the differential gear unit 22 via the counter driven gear 38 and the differential drive gear 40 that are provided to the counter shaft 36. The motive power from the second electric motor MG2 is transmitted to the counter driven gear 38 via a second output gear 46, and is then outputted to the differential input gear 42 via the differential drive gear 40.

In addition, the vehicle includes a transaxle case 50 (hereinafter, referred to as a "case 50") as a non-rotary member housing the power transmission system 10 and others therein, except for the engine 14. The case 50 is made of an aluminum alloy, such as aluminum for casting with a low aluminum purity, and the case 50 has a high strength. The case 50 includes a front cover 52, a cylindrical first body case 54, a cylindrical second body case 56, and a rear cover 58 that are arranged in this order from the engine 14 side. The case 50 is configured by liquid-tightly coupling, with bolts or the like, respective end surfaces (contact surfaces) in a rotary axial line C1 direction between the front cover 52 and the first body case 54, between the first body case 54 and the second body case 56, and between the second body case 56 and the rear cover 58, wherein the rotary axial line C1 direction is a direction in which the first rotor shaft 32 extends. Through this, the inside of the case 50 is configured to be oil-tight and prevented from invasion of external foreign matters or the like.

Figure 2:
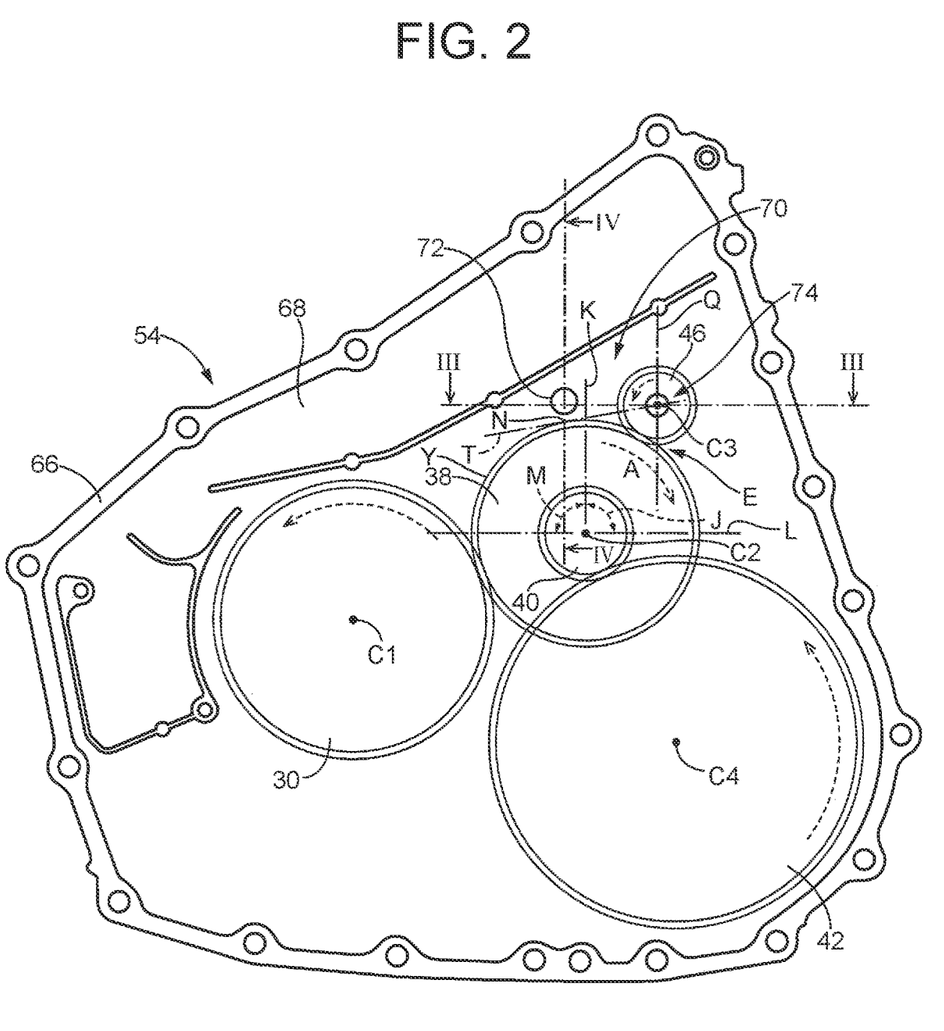
FIG. 2 is a front view of an inside of a first body case composing a transaxle case for housing the power transmission system for the hybrid vehicle in FIG. 1 therein, as viewed from a second body case side.

FIG. 2 is a front view of the inside of the first body case 54 composing the transaxle case 50 of the present embodiment example, as viewed from the second body case 56 side, and the upward direction of FIG. 2 is a vertical upward direction, that is, an upward direction of the vehicle. The first body case 54 has a contact surface 66 on an outer circumference thereof, the contact surface 66 to be in contact with a contact surface of the second body case 56 in an assembled state, and is fastened to the second body case 56 via a sealing member or the like with not-shown multiple bolts. The first body case 54 includes a partition wall 68 formed to be substantially vertical to rotary axial lines of the respective shafts (the input shaft 34, the counter shaft 36, the reduction shaft 45). Bearings (not-shown) are disposed between the partition wall 68 of the first body case 54 and ends on the front cover 52 side of the respective shafts (the input shaft 34, the counter shaft 36, the reduction shaft 45), and between the partition wall 68 and the differential case to which the differential input gear 42 is fixed. In FIG. 2, in order to illustrate a positional relation in the first body case 54 among the respective gears (the output gear 30, the counter driven gear 38, the differential drive gear 40, the second output gear 46, the differential input gear 42) that are provided on the corresponding rotary axial lines of the respective shafts (the input shaft 34, the counter shaft 36, the reduction shaft 45, the axles 24), the respective gears are schematically indicated by double lines. An outer circumferential circle of each gear indicated by the double line is an addendum circle of this gear in a plane orthogonal to each corresponding rotary axial line. In addition, the rotating direction of each gear during a forward traveling of the vehicle is indicated by a broken-line arrow. The differential input gear 42 is disposed inside the case 50 in such that a lower part of the differential input gear 42 is soaked in the lubricating oil reserved in a lower part of the case 50. Through this, during the forward traveling of the vehicle, when the differential input gear 42 rotates in the direction indicated by the broken-line arrow, the lubricating oil reserved in the lower part of the case 50 is scooped up by the differential input gear 42, so that the lubricating oil is supplied to the output gear 30 and others from thereabove.

A reduction gear pair to reduce speed of the rotation of the second electric motor MG2 and transmit this rotation to the counter shaft 36 is composed of the second output gear 46 provided to the reduction shaft 45 and the counter driven gear 38 provided to the counter shaft 36. A meshing position E between the second output gear 46 and the counter driven gear 38 is located within a rotational angle range J that is equal to or larger than 90° and is less than 180°, and that is a rotational angle range between a vertical plane K passing through a rotary axial line C2 of the counter shaft 36 and a horizontal plane L passing through the rotary axial line C2 when a rotational angle range of the counter driven gear 38 located more vertically upward than the rotary axial line C2 is set to be from 0° to 180° toward a rotating direction A of the counter driven gear 38 during the forward traveling of the vehicle. That is, the second output gear 46 is arranged relative to the counter driven gear 38 in such a manner that a vertical plane Q passing through a rotary axial line C3 where the second output gear 46 is provided has a predetermined distance from the vertical plane K passing through the rotary axial line C2. In the case 50, a lubricating device 70 of the gear apparatus for the vehicle to lubricate the second output gear 46 and the counter driven gear 38 is provided. Note that the second output gear 46 and the counter driven gear 38 may correspond to the gear apparatus for the vehicle of the present disclosure, the second output gear 46 may be regarded as a high-rotation-side gear, and the counter driven gear 38 may be regarded as a low-rotation-side gear.

Figure 3:
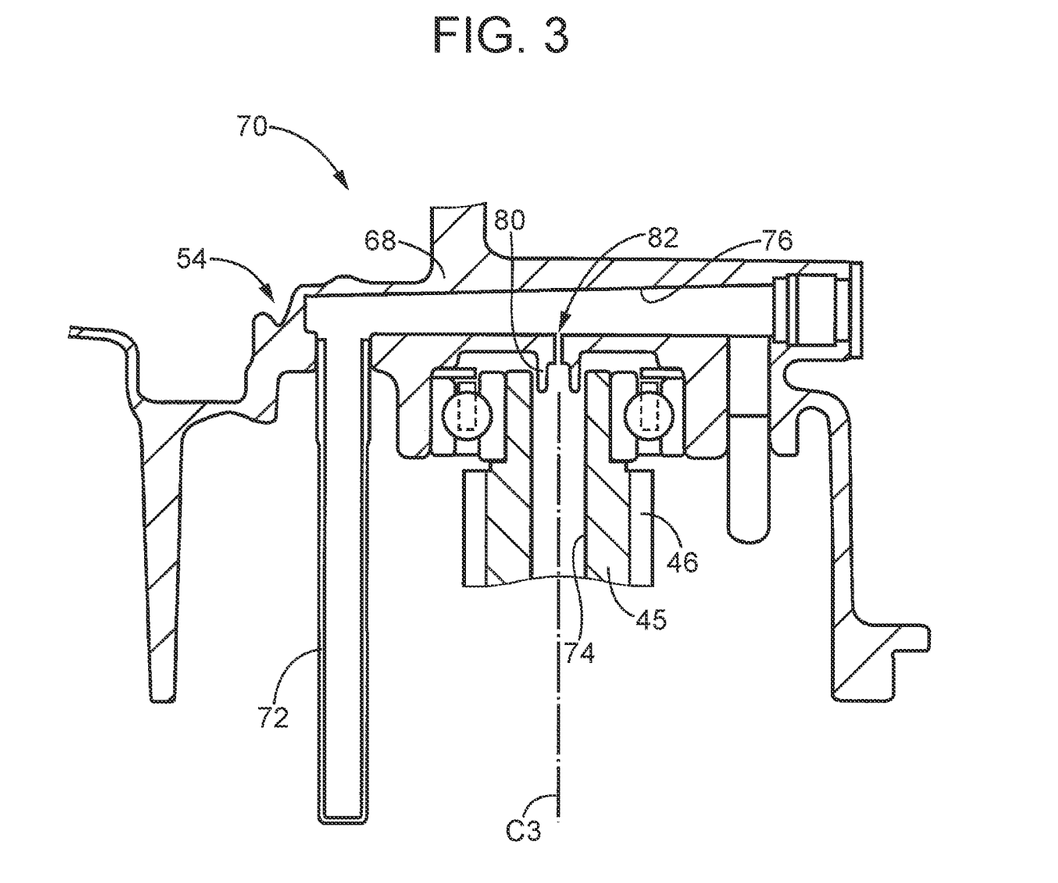
FIG. 3 is a cross sectional view taken along line of the first body case in FIG. 2, and is a view showing a lubricating device of a gear apparatus for a vehicle provided in the transaxle case.
Figure 4:
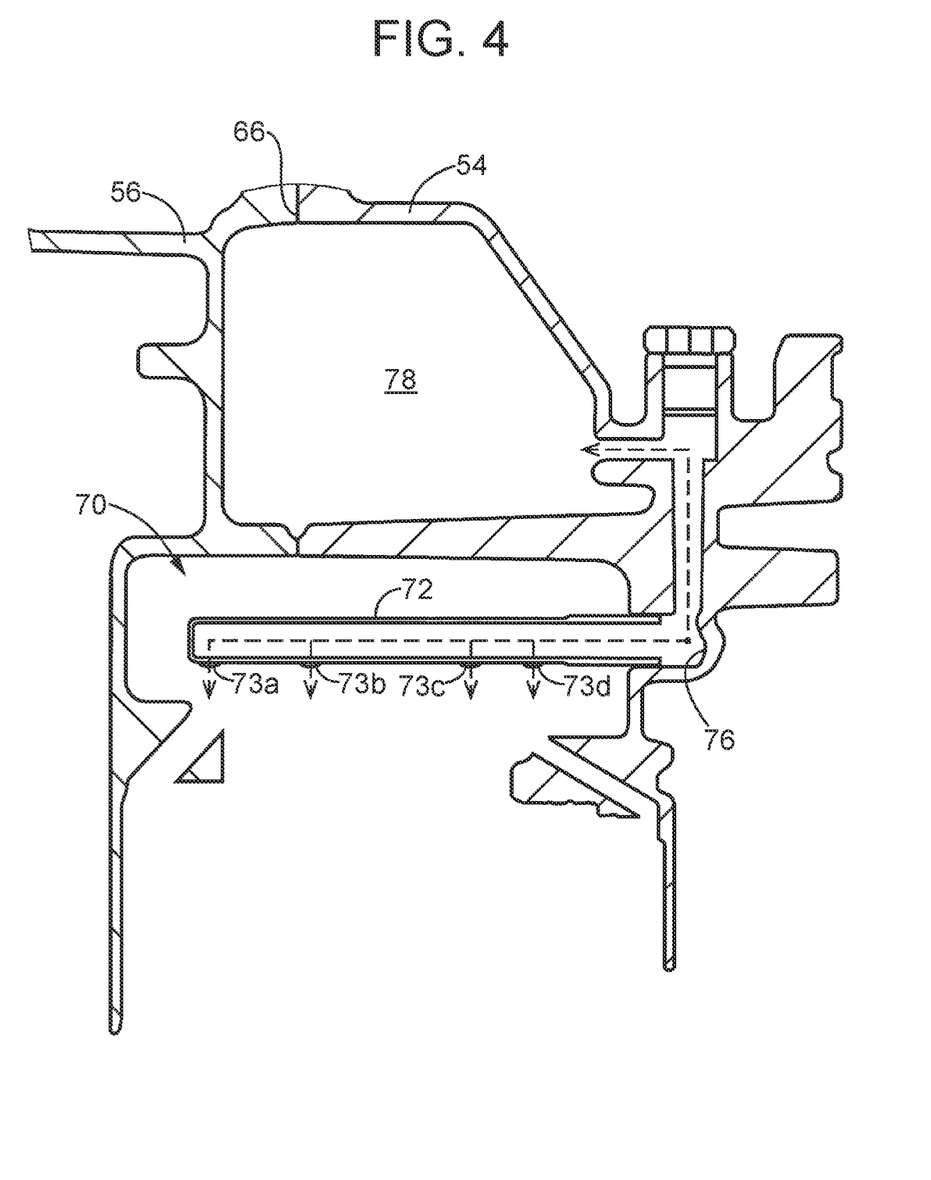
FIG. 4 is a cross sectional view taken along line IV-IV of the first body case in FIG. 2, and is a view showing the lubricating device of the gear apparatus for the vehicle provided in the transaxle case.

FIG. 3 is a cross sectional view taken along line of the first body case 54, and is a view showing the lubricating device 70 of the gear apparatus for the vehicle provided in the case 50. FIG. 4 is a cross sectional view taken along line IV-IV of the first body case 54, and is a view showing the lubricating device 70 of the gear apparatus for the vehicle provided in the case 50. In FIG. 4, the second body case 56 fastened to the first body case 54 is also illustrated.

In the partition wall 68 of the first body case 54, there is formed an oil supply passage 76 that extends in a direction substantially vertical to the rotary axial line C3 of the reduction shaft 45 on a horizontal plane including the rotary axial line C3 of the reduction shaft 45, and supplies the lubricating oil to a lubricating oil supply pipe 72 described later. The lubricating oil is pressurized and sent from the oil pump 26 into the oil supply passage 76. One end of the oil supply passage 76 is opened toward the second body case 56 side. The lubricating oil supply pipe 72 has a bottomed cylindrical shape as shown in FIG. 4, and the one opening end thereof is fixed to the partition wall 68 so as to communicate with one end of the oil supply passage 76. As shown in FIG. 3, the lubricating oil supply pipe 72 is arranged such that a center line thereof is substantially parallel to the rotary axial line C3 where the second output gear 46 meshing with the counter driven gear 38 is provided. As shown in FIG. 2, the lubricating oil supply pipe 72 is arranged to be located within a rotational angle range M that is equal to or larger than 0° and is less than 90°, and that is a rotational angle range smaller than the rotational angle of the meshing position E, and that is a rotational angle range between the vertical plane K passing through the rotary axial line C2 of the counter shaft 36 and the horizontal plane L passing through the rotary axial line C2 when the center line of the lubricating oil supply pipe 72 is located vertically above the counter driven gear 38, and a rotational angle range of the counter driven gear 38 located vertically above the rotary axial line C2 is set to be from 0° to 180° toward the rotating direction A of the counter driven gear 38 during the forward traveling of the vehicle. In addition, the lubricating oil supply pipe 72 includes nozzles 73a, 73b, 73c, 73d (hereinafter, also referred to simply as nozzles 73 unless otherwise distinguished) in a vertically lower part thereof at multiple positions in the longitudinal direction. These nozzles 73 are used for supplying the lubricating oil to a downward direction of the lubricating oil supply pipe 72. In FIG. 4, flows of the lubricating oil from the oil supply passage 76 are indicated by broken-line arrows. Some of the lubricating oil supplied from the oil pump 26 to the oil supply passage 76 is supplied from the nozzles 73 of the lubricating oil supply pipe 72 toward the downward direction of the lubricating oil supply pipe 72. A tooth surface position N supplied with the lubricating oil from the nozzle 73c of the lubricating oil supply pipe 72 of the counter driven gear 38 is located vertically downward of the lubricating oil supply pipe 72. The lubricating oil supply pipe 72 is arranged such that in a plane orthogonal to the rotary axial line C3 of the second output gear 46 and the rotary axial line C2 of the counter driven gear 38, a tangential line T on an addendum circle Y of the counter driven gear 38, the tangential line T passing through the tooth surface position N directly supplied with the lubricating oil from the lubricating oil supply pipe 72 of the counter driven gear 38 is set to pass through the second output gear 46. In addition, some of the lubricating oil supplied to the oil supply passage 76 is supplied to a reservoir tank 78 that is defined by the first body case 54 and the second body case 56 and provided to an vertically upper part of the case 50, and this reservoir tank 78 guides the lubricating oil to an opposite side to the differential input gear 42 relative to the output gear 30 in FIG. 1, and reserves the lubricating oil therein.

The above-configured lubricating oil supply pipe 72 directly supplies the lubricating oil supplied by the oil supply passage 76, from the nozzle 73c toward the vertically downward direction so as to directly supply the tooth surface position N located more upstream of the rotating direction A during the forward traveling of the vehicle than the meshing position E of the counter driven gear 38 with the second output gear 46. Because the lubricating oil supply pipe 72 is disposed above the counter driven gear 38, the lubricating oil can be supplied to the tooth surface position N of the counter driven gear 38 even if the flow rate of the lubricating oil supplied by the oil supply passage 76 is low. Note that the oil supply passage 76 and the lubricating oil supply pipe 72 may be regarded as a first tooth surface lubricating oil supply part.

As shown in FIG. 3, the first body case 54 includes an annular projection 80 formed by annually projecting the partition wall 68 toward the second body case 56, and a communicating passage 82 with a small diameter providing communication with an inner space formed by the oil supply passage 76 and the annular projection 80. A projecting end of the annular projection 80 is inserted in a shaft center oil passage 74 in a manner as not to be in sliding contact with an inner circumferential surface of the reduction shaft 45. The communicating passage 82 supplies the lubricating oil in the oil supply passage 76 to the inner space formed by the annular projection 80, and the annular projection 80 guides the lubricating oil having passed through the communicating passage 82 into the shaft center oil passage 74. Note that the oil supply passage 76, the annular projection 80, and the communicating passage 82 may be regarded as an in-shaft lubricating oil supply part.

As aforementioned, the lubricating device 70 of the gear apparatus for the vehicle is composed of the oil supply passage 76 supplied with a hydraulic oil from the oil pump 26, the lubricating oil supply pipe 72 directly supplying the lubricating oil to the tooth surface position N of the counter driven gear 38 that is the low-rotation-side gear, the communicating passage 82 supplying the lubricating oil into the shaft center oil passage 74 of the second output gear 46 that is the high-rotation-side gear, the annular projection 80, and others; and the lubricating device 70 is housed in the case 50.

Figure 5:
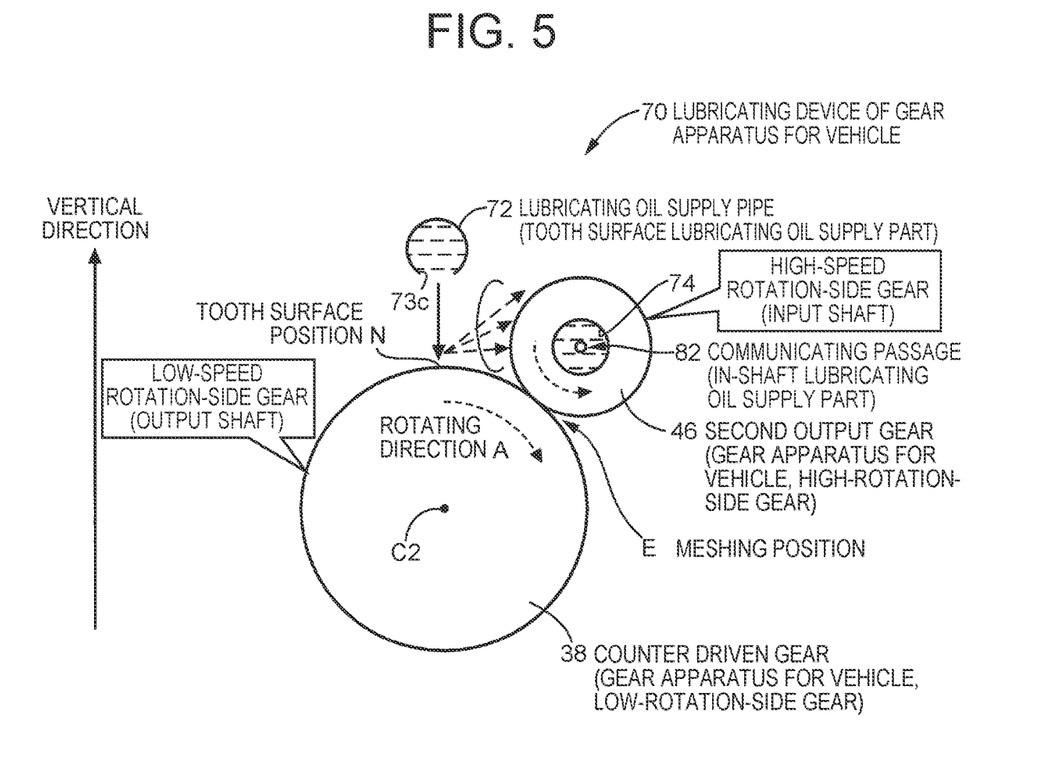
FIG. 5 is a schematic view explaining lubrication on a counter driven gear and a second output gear by the lubricating device of the gear apparatus for the vehicle in FIG. 3.
Figure 6:
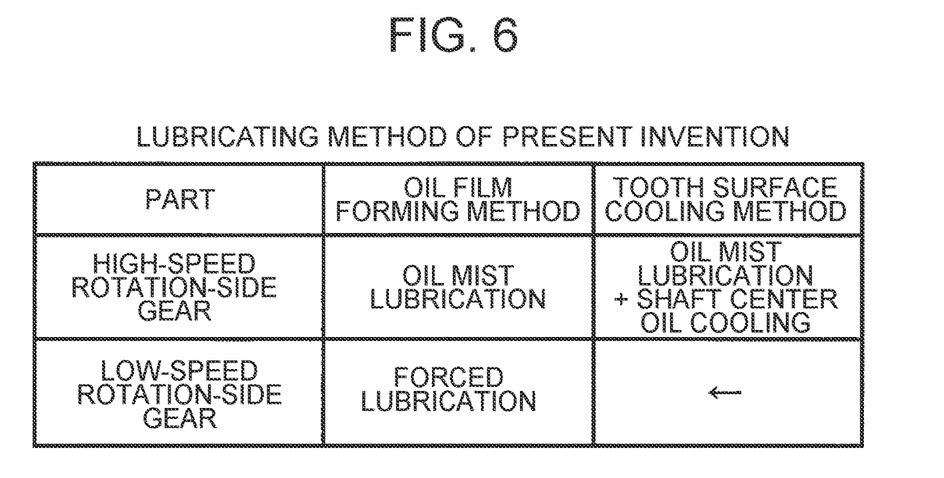
FIG. 6 is a view explaining a lubricating method in the lubricating device of the gear apparatus for the vehicle in FIG. 3.

FIG. 5 is a schematic view explaining lubrication on the counter driven gear 38 and the second output gear 46 by the lubricating device 70 of the gear apparatus for the vehicle during the forward traveling of the vehicle. FIG. 6 is a view explaining a lubricating method in the lubricating device 70 of the gear apparatus for the vehicle. In FIG. 5, the upward direction in the vertical direction is indicated by an arrow. An arrow in FIG. 6 indicates that a tooth surface cooling method of the counter driven gear 38 (the low-speed rotation-side gear) is the forced lubrication that is the same as that in the oil forming method.

In FIG. 5, the counter driven gear 38 (low-speed rotation-side gear), which is provided to the counter shaft 36 (the output shaft) that outputs the drive force of the second electric motor MG2 inputted from the reduction shaft 45 (the input shaft) to the differential gear unit 22, is directly supplied from the nozzle 73c of the lubricating oil supply pipe 72 with the lubricating oil at the tooth surface position N located more upstream of the rotating direction A during the forward traveling of the vehicle than the meshing position E of the counter driven gear 38 with the second output gear 46. Here, the lubricating method for the gear that supplies the lubricating oil directly to the tooth surface of the gear is referred to as the forced lubrication. As shown in FIG. 6, through the forced lubrication, an oil film is formed on the tooth surface of the counter driven gear 38, and the tooth surface thereof is cooled at the same time. Some of the lubricating oil supplied from the lubricating oil supply pipe 72 to the tooth surface position N of the counter driven gear 38 is splashed from the tooth surface position N toward the second output gear 46 in arrow directions indicated by broken lines by the rotation in the rotating direction A of the counter driven gear 38. The lubricating oil finely splashed from the tooth surface position N of the counter driven gear 38 toward the above arrow directions is sprayed on the tooth surface of the second output gear 46 as an oil mist that is misted (misted oil), for example. As shown in FIG. 2, the second output gear 46 is arranged relative to the counter driven gear 38 such that the meshing position E with the counter driven gear 38 is located within the rotational angle range J of the counter driven gear 38, and the vertical plane Q passing through the rotary axial line C3 where the second output gear 46 is provided has a predetermined distance from a vertical plane K passing through the rotary axial line C2 where the counter driven gear 38 is provided. The lubricating oil supply pipe 72 is arranged such that in the plane orthogonal to the rotary axial line C3 of the second output gear 46 and the rotary axial line C2 of the counter driven gear 38, the tangential line T on an addendum circle Y of the counter driven gear 38, the tangential line T passing through the tooth surface position N directly supplied with the lubricating oil from the lubricating oil supply pipe 72 of the counter driven gear 38 is set to pass through the second output gear 46, more preferably to pass through the rotary axial line C3 of the second output gear 46. Hence, some of the lubricating oil supplied to the tooth surface position N of the counter driven gear 38 is efficiently supplied to the tooth surface of the second output gear 46 as the oil mist. As shown in FIG. 6, the second output gear 46 is lubricated by being supplied with the lubricating oil (oil mist) splashed from the counter driven gear 38, that is, by a so-called oil mist lubrication, thereby forming an oil film on the tooth surface of the second output gear 46, and cooling this tooth surface at the same time. As shown in FIG. 6, the tooth surface of the second output gear 46 is also cooled by the lubricating oil supplied into the shaft center oil passage 74 of the reduction shaft 45 from the oil supply passage 76 via the communicating passage 82 and the annular projection 80. When a transmission torque from the reduction shaft 45 to the counter shaft 36 is so great that the amount of lubricating oil sprayed to the tooth surface of the second output gear 46 through the oil mist lubrication does not satisfy a necessary amount for sufficiently cooling the tooth surface of the second output gear 46, the lubricating oil supplied into the shaft center oil passage 74 allows the tooth surface of the second output gear 46 to be sufficiently cooled. In this manner, the oil film formation and the cooling on the respective tooth surfaces of the counter driven gear 38 and the second output gear 46 are carried out, thereby enhancing durability of the counter driven gear 38 and the second output gear 46. Because some of the lubrication of the second output gear 46 is carried out through the oil mist lubrication, the amount of lubricating oil that reaches the meshing position E between the second output gear 46 and the counter driven gear 38 becomes smaller than that in the case of supplying the lubricating oil directly to the meshing position 118 between the low-rotation-side gear 114 and the high-rotation-side gear 116 in the lubricating device 110 of the gear apparatus for the vehicle of the related art as shown in FIG. 8, for example.

As aforementioned, according to the lubricating device 70 of the gear apparatus for the vehicle of the present embodiment example, the oil supply passage 76 and the lubricating oil supply pipe 72 supplied with the lubricating oil from the oil supply passage 76 are configured to directly supply the lubricating oil to the tooth surface position N located more upstream of the rotating direction A than the meshing position E of the counter driven gear 38 with the second output gear 46 having a higher rotation speed than that of the counter driven gear 38. In addition, some of the lubricating oil supplied to the tooth surface position N is sprayed as the oil mist toward the tooth surface of the second output gear 46 by the rotation of the counter driven gear 38. The tooth surface of the second output gear 46 is supplied with the lubricating oil, not directly but through spraying by the rotation of the counter driven gear 38. Therefore, the amount of lubricating oil reaching the meshing position E between the counter driven gear 38 and the second output gear 46 becomes less than, for example, that of the lubricating device 110 of the gear apparatus for the vehicle in FIG. 8 that supplies the lubricating oil directly to the meshing position 118 between the low-rotation-side gear 114 and the high-rotation-side gear 116. Through this, it is possible to secure the durability of the counter driven gear 38 and the second output gear 46, and also reduce the agitation loss that is caused because the lubricating oil on the tooth surface is sandwiched and pressurized at the meshing position E at a high circumferential speed, and because the lubricating oil is accelerated by the high rotation of the second output gear 46, and others. The shaft center oil passage 74 of the reduction shaft 45 is supplied with the lubricating oil from the oil supply passage 76 via the communicating passage 82 and the annular projection 80. Through this, even if the amount of lubricating oil sprayed to the second output gear 46 by the rotation of the counter driven gear 38 in the oil mist lubrication is insufficient for sufficiently cooling the tooth surface of the second output gear 46, it is possible to sufficiently cool the tooth surface of the second output gear 46.

Moreover, according to the lubricating device 70 of the gear apparatus for the vehicle of the present embodiment, the meshing position E of the counter driven gear 38 with the second output gear 46 is located within the rotational angle range J that is equal to or larger than 90° and is less than 180° when the rotational angle range of the counter driven gear 38 located above the rotary axial line C2 of the counter driven gear 38 is set to be from 0° to 180° toward the rotating direction A of the counter driven gear 38 during the forward traveling of the vehicle. In addition, the lubricating oil supply pipe 72 is arranged such that in the plane orthogonal to the rotary axial line C3 of the second output gear 46 and the rotary axial line C2 of the counter driven gear 38, the tangential line T on the addendum circle Y of the counter driven gear 38, the tangential line T passing through the tooth surface position N directly supplied with the lubricating oil from the lubricating oil supply pipe 72 of the counter driven gear 38 toward the vertically downward direction is set to pass through the second output gear 46. Hence, some of the lubricating oil supplied to the tooth surface position N located more upstream of the rotating direction A than the meshing position E of the counter driven gear 38 with the second output gear 46 is more efficiently sprayed toward the tooth surface of the second output gear 46 by the rotation of the counter driven gear 38.

Furthermore, according to the lubricating device 70 of the gear apparatus for the vehicle of the present embodiment example, the oil mist spray lubrication on the second output gear 46 is carried out by spraying the lubricating oil directly supplied to the counter driven gear 38 from the lubricating oil supply pipe 72 by the rotation of the counter driven gear 38; therefore, it is unnecessary to additionally provide an oil mist generating mechanism to generate the oil mist in the case 50, thus reducing the number of components as well as attaining cost reduction.

The lubricating oil supply pipe 72 is provided vertically upward of the counter driven gear 38 so as to supply the lubricating oil directly to the tooth surface position N of the counter driven gear 38 located vertically downward thereof. Accordingly, it is possible to supply the lubricating oil to the counter driven gear 38 even if the flow rate of the lubricating oil supplied to the lubricating oil supply pipe 72 is low.

Next, another embodiment example will be described. In the following embodiment example, components that has substantially common functions to those of the above embodiment example are denoted with the same reference numerals, and detailed description thereof will be omitted.

A lubricating device 84 of the gear apparatus for the vehicle of the present embodiment example has substantially common functions to those of the above first embodiment example except for an additionally provided mechanism to directly supply the lubricating oil to the counter driven gear 38. Hereinafter, different points thereof will be described with reference to FIG. 7.

Figure 7:
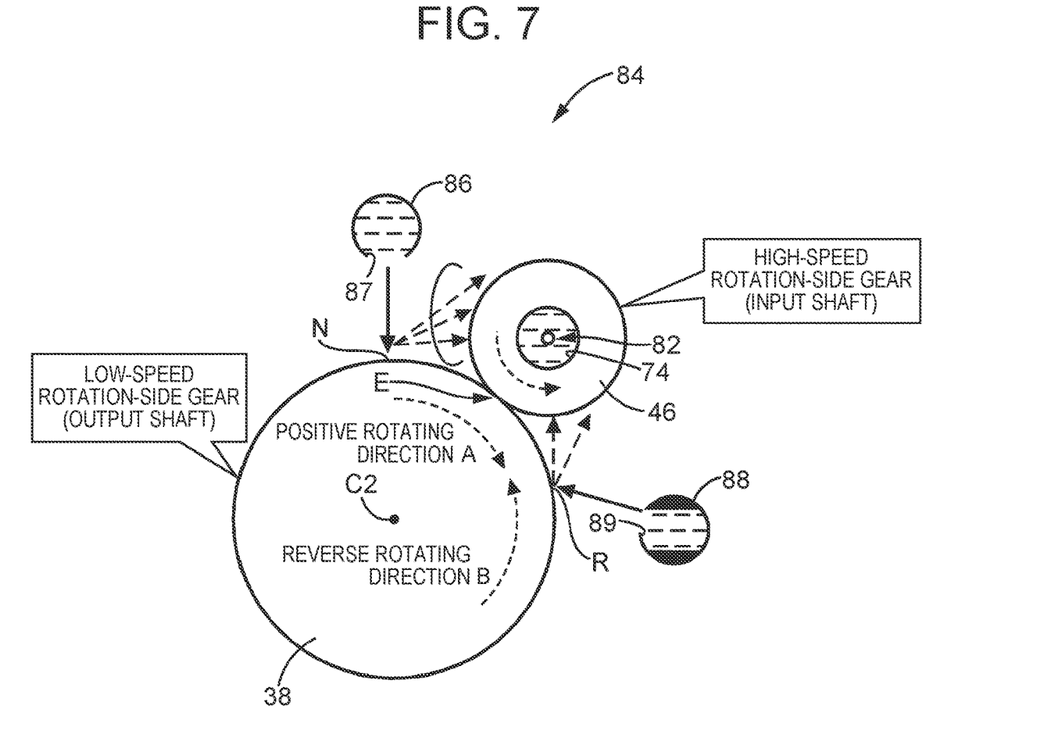
FIG. 7 is a schematic view explaining lubrication on the counter driven gear and the second output gear by a lubricating device of a gear apparatus for the vehicle in another embodiment example.

FIG. 7 is a schematic view explaining lubrication on the counter driven gear 38 and the second output gear 46 by the lubricating device 84 of the gear apparatus for the vehicle. The lubricating device 84 of the gear apparatus for the vehicle includes the oil supply passage 76, a first lubricating oil supply pipe 86, and a second lubricating oil supply pipe 88 as a mechanism to directly supply the lubricating oil to the counter driven gear 38. The first lubricating oil supply pipe 86 includes multiple nozzles 87, and has the same structure and function as those of the lubricating oil supply pipe 72 of the aforementioned first embodiment example. The second lubricating oil supply pipe 88 has a bottomed cylindrical shape, and the second lubricating oil supply pipe 88 is arranged such that a center line thereof is substantially parallel to the rotary axial line C2 where the counter driven gear 38 is provided and the rotary axial line C3 where the second output gear 46 is provided. The second lubricating oil supply pipe 88 includes multiple nozzles 89. The second lubricating oil supply pipe 88 supplies the lubricating oil from the nozzle 89 directly to a tooth surface position R located more upstream of a rotating direction B (reverse rotating direction) indicated by a broken-line arrow during the backward traveling of the vehicle than the meshing position E of the counter driven gear 38 with the second output gear 46. Some of the lubricating oil supplied from the second lubricating oil supply pipe 88 to the tooth surface position R of the counter driven gear 38 is splashed from the tooth surface position R toward arrow directions indicated by broken lines by the rotation in the rotating direction B of the counter driven gear 38 during the backward traveling of the vehicle so as to spray the lubricating oil toward the tooth surface of the second output gear 46 as the oil mist. Note that the second lubricating oil supply pipe 88 may be regarded as a second tooth surface lubricating oil part.

According to the above-configured lubricating device 84 of the gear apparatus for the vehicle, also during the backward traveling of the vehicle in addition to the forward traveling of the vehicle, the tooth surface of the second output gear 46 is lubricated by the oil mist, thereby further enhancing the durability of the counter driven gear 38 and the second output gear 46. In addition, also during the backward traveling of the vehicle, the amount of lubricating oil reaching the meshing position E between the counter driven gear 38 and the second output gear 46 becomes less than that in the case of directly supplying the lubricating oil to the meshing position 118, as with the lubricating device 110 of the gear apparatus for the vehicle in FIG. 8, for example; therefore, it is possible to reduce the agitation loss of the lubricating oil at the meshing position E.

According to the first embodiment, the lubricating oil is directly supplied to the tooth surface position of the low-rotation-side gear located more upstream of the rotating direction than the meshing position of the low-rotation-side gear with the high-rotation-side gear by the tooth surface lubricating oil supply part, thereby spraying some of the lubricating oil supplied to the tooth surface position toward the tooth surface of the high-rotation-side gear by the rotation of the low-rotation-side gear. Hence, the tooth surface of the high-rotation-side gear is supplied with the lubricating oil not directly but through spraying by the rotation of the low-rotation-side gear; thus, it is possible to secure the durability of the low-rotation-side gear and the high-rotation-side gear, and reduce the agitation loss because the amount of lubricating oil reaching the meshing position between the low-rotation-side gear and the high-rotation-side gear. In addition, because the lubricating oil is supplied into the shaft of the high-rotation-side gear by the in-shaft lubricating oil supply part, it is possible to sufficiently cool the tooth surface of the high-rotation-side gear.

According to the second embodiment, in the first embodiment, the meshing position of the low-rotation-side gear with the high-rotation-side gear is located within the rotational angle range that is equal to or larger than 90° and is less than 180° when the rotational angle range of the low-rotation-side gear located vertically above the rotary axial line of the low-rotation-side gear is set to be from 0° to 180° toward the rotating direction of the low-rotation-side gear. Accordingly some of the lubricating oil supplied to the tooth surface position located more upstream of the rotating direction than the meshing position of the low-rotation-side gear with the high-rotation-side gear is more efficiently sprayed toward the tooth surface of the high-rotation-side gear by the rotation of the low-rotation-side gear.

According to the third embodiment, the tooth surface lubricating oil supply part is arranged such that in the plane orthogonal to the respective rotary axial lines of the low-rotation-side gear and the high-rotation-side gear, the tangential line that is on the addendum circle of the low-rotation-side gear and passes through tooth surface position is set to pass through the high-rotation-side gear. Accordingly, some of the lubricating oil supplied to the tooth surface position located more upstream of the rotating direction than the meshing position of the low-rotation-side gear with the high-rotation-side gear is more efficiently sprayed toward the tooth surface of the high-rotation-side gear by the rotation of the low-rotation-side gear.

As aforementioned, the present disclosure has been described in detail with reference to the table and the drawings, but the present disclosure may be carried out by further other aspects, and may be variously changed without departing from the scope of the present disclosure.

What is claimed is:

1. A lubricating device of a gear apparatus for a vehicle, the lubricating device comprising:
   a first tooth surface lubricating oil supply part including a lubricating oil supply pipe including a nozzle in a vertically lower part of the lubricating oil supply pipe; and
   an in-shaft lubricating oil supply part,
   wherein:
   the lubricating device is configured to lubricate a low-rotation-side gear and a high-rotation-side gear that meshes with the low-rotation-side gear,
   when the low-rotation-side gear has a first rotational angle range that is: (i) located vertically above a horizontal plane defined by a rotary axial line of the low-rotation-side gear, and (ii) set to be from 0° to 180° in a rotating direction of the low-rotation-side gear from upstream to downstream, a meshing position of the low-rotation-side gear with the high-rotation-side gear is located within a second rotational angle range that is included in the first rotational angle range, and the second rotational angle range is equal to or larger than 90° and less than 180°,
   the first tooth surface lubricating oil supply part is configured to supply a lubricating oil directly to a first tooth surface position of the low-rotation-side gear located upstream of the meshing position in the rotating direction of the low-rotation-side gear so as to spray some of the lubricating oil from the first tooth surface position of the low-rotation-side gear toward a first tooth surface of the high-rotation-side gear,
   the lubricating oil supply pipe is: (i) configured to supply the lubricating oil from the nozzle vertically downward and directly to the first tooth surface position of the low-rotation-side gear, and (ii) located within a third rotational angle range that is included in the first rotational angle range, and the third rotational angle range is equal to or larger than 0° and is less than 90°, wherein the first tooth surface position of the low-rotation-side gear is arranged such that in the plane orthogonal to respective rotary axial lines of the low-rotation-side gear and the high-rotation-side gear, the tangential line passing through the first tooth surface position of the low-rotation-side gear on an addendum circle of the low-rotation-side gear is set to pass through the rotary axial line of the high-rotation-side gear and
   the in-shaft lubricating oil supply part is configured to supply the lubricating oil into a shaft of the high-rotation-side gear.

2. The lubricating device of the gear apparatus for the vehicle according to claim 1, further comprising a second tooth surface lubricating oil supply part configured to supply the lubricating oil to a second tooth surface position of the low-rotation-side gear located downstream of the meshing position in the rotating direction of the low-rotation-side gear.

* * * * *